US012739281B2

(12) United States Patent
Liu et al.

(10) Patent No.: US 12,739,281 B2
(45) Date of Patent: Sep. 15, 2026

(54) NETWORK CONFIGURATION PROTOCOL DATASTORE ENCRYPTION

(71) Applicant: Telefonaktiebolaget LM Ericsson (PUBL), Stockholm (SE)

(72) Inventors: Daiying Liu, Beijing (CN); Renwang Liu, Beijing (CN); Min Luo, Beijing (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 168 days.

(21) Appl. No.: 18/684,107

(22) PCT Filed: Aug. 16, 2021

(86) PCT No.: PCT/CN2021/112703

§ 371 (c)(1),
(2) Date: Feb. 15, 2024

(87) PCT Pub. No.: WO2023/019386

PCT Pub. Date: Feb. 23, 2023

(65) Prior Publication Data

US 2024/0380788 A1 Nov. 14, 2024

(51) Int. Cl.

| | |
|---|---|
| ***G06F 15/177*** | (2006.01) |
| ***G06F 9/54*** | (2006.01) |
| ***G06F 15/16*** | (2006.01) |
| ***H04L 9/40*** | (2022.01) |
| ***H04L 41/28*** | (2022.01) |
| ***H04L 67/133*** | (2022.01) |

(52) U.S. Cl.

CPC .............. *H04L 63/20* (2013.01); *G06F 9/546* (2013.01); *H04L 41/28* (2013.01); *H04L 67/133* (2022.05)

(58) Field of Classification Search

CPC ....... H04L 63/20; H04L 41/28; H04L 67/133; G06F 9/546

USPC .................................. 726/1–5; 709/220–222

See application file for complete search history.

(56) References Cited

U.S. PATENT DOCUMENTS

| | | | | |
|---|---|---|---|---|
| 9,729,409 | B2 * | 8/2017 | Wanser | H04L 41/0816 |
| 9,762,554 | B2 * | 9/2017 | Zömbik | H04L 41/28 |
| 10,701,060 | B2 * | 6/2020 | Han | H04L 63/0823 |
| 11,233,691 | B2 * | 1/2022 | Grayson | H04L 41/0803 |
| 11,411,797 | B2 * | 8/2022 | Liu | H04L 41/0806 |
| 11,700,236 | B2 * | 7/2023 | Miriyala | H04L 41/046 726/1 |
| 11,979,281 | B2 * | 5/2024 | A | H04L 41/0816 |
| 12,127,042 | B2 * | 10/2024 | Grayson | H04L 41/0806 |

(Continued)

OTHER PUBLICATIONS

R. Enns, Ed. "Network Configuration Protocol (NETCONF)"; Internet Engineering Task Force (IETF); Request for Comments: 6241; ISSN: 2070-1721—Jun. 2011.

(Continued)

*Primary Examiner* — Bharat Barot

(74) *Attorney, Agent, or Firm* — Baker Botts L.L.P.

(57) ABSTRACT

Methods and devices for encrypting Network Configuration Protocol (NETCONF) datastore in communication networks are disclosed. One of the methods is performed by a device using NETCONF. The method comprises enabling a function for NETCONF Datastore Security (DS-SEC). The method further comprises publishing a first indication indicating that the device supports the NETCONF DS-SEC function.

15 Claims, 5 Drawing Sheets

(56) References Cited

U.S. PATENT DOCUMENTS

| | | | | |
|---|---|---|---|---|
| 2010/0057849 | A1* | 3/2010 | Ji | H04L 41/0681 709/203 |
| 2020/0274753 | A1* | 8/2020 | Guo | H04L 41/28 |
| 2023/0028059 | A1* | 1/2023 | Shelton, IV | G06F 9/542 |

OTHER PUBLICATIONS

PCT Notification of Transmittal of the International Search Report and the Written Opinion of the International Searching Authority, or the Declaration issued for International application No. PCT/CN2021/112703—Jan. 17, 2022.

EPO Communication pursuant to Article 94(3) EPC issued for Application No. 21 765 563.8-1218—Jun. 2, 2025.

* cited by examiner

NETWORK CONFIGURATION PROTOCOL DATASTORE ENCRYPTION

PRIORITY

This nonprovisional application is a U.S. National Stage Filing under 35 U.S.C. § 371 of International Patent Application Serial No. PCT/CN2021/112703 filed Aug. 16, 2021 and entitled "Network Configuration Protocol Datastore Encryption," which is hereby incorporated by reference in its entirety.

TECHNICAL FIELD

The present disclosure generally relates to communication networks, and more particularly relates to methods and devices for Network Configuration Protocol (NETCONF) datastore encryption in communication networks.

BACKGROUND

The Network Configuration Protocol (NETCONF) is defined in RFC (Request for Comments) 6241 of the IETF (Internet Engineering Task Force). It provides mechanisms to install, manipulate, and delete the configuration of network devices. It uses an Extensible Markup Language (XML)-based data encoding for the configuration data as well as for the protocol messages. The NETCONF protocol operations are realized as remote procedure calls (RPCs).

The NETCONF protocol defines a simple mechanism through which a network device can be managed, configuration data information can be retrieved, and new configuration data can be uploaded and manipulated. The protocol allows the device to expose a full, formal application programming interface (API). Applications can use this straightforward API to send and receive full and partial configuration data sets.

The NETCONF protocol defines the existence of one or more configuration datastores and allows configuration operations on them. As defined in the IETF standard, a NETCONF datastore is defined as the complete set of configuration data that is required to get a device from its initial default state into a desired operational state. Thus, the NETCONF datastore could contain many keys and critical information like user role, privileges and even password(s). Disclosure of this critical information could have serious consequences.

SUMMARY

However, there are some problems with the way NETCONF datastores currently handled. For instance, a running NETCONF datastore holds the complete configuration currently active on a network device and the data, which is XML based and is store as clear content that is human readable. It means anyone who has access to the device could get access to the complete device datastore and obtain (and even tamper with) critical information.

Some embodiments herein may advantageously solve or at least mitigate one or more of the problems discussed above.

More particularly, some embodiments include a method performed by a device using Network Configuration Protocol (NETCONF). The method comprises enabling a function for NETCONF Datastore Security (DS-SEC) and publishing a first indication indicating that the device supports the NETCONF DS-SEC function.

In some embodiments, publishing the indication indicating that the device supports the NETCONF DS-SEC function comprises sending a first message including the first indication to a controller of the device.

In some embodiments, the first message comprises a first <hello> message comprising a first <capability> element, and wherein the first <capability> element comprises the first indication.

In some embodiments, the method may further comprise receiving a second message from a controller of the device, wherein the second message comprises a second indication indicating whether the controller supports the NETCONF DS-SEC function.

In some embodiments, the second message comprises a second <hello> message comprising a second <capability> element, and wherein the second <capability> element comprises the second indication.

In some embodiments, the method may further comprise receiving a third message from a controller of the device and, enabling or disabling the NETCONF DS-SEC function of the device according to the message. In some embodiments, the third message comprises a Remote Procedure Call (RPC) from the controller. In other embodiments, the third message includes a third indication indicating to either enable or disable the NETCONF DS-SEC function of the device.

In some embodiments, the method may further comprise publishing a fourth indication indicating the encryption algorithm supported by the device. In some embodiments, the fourth indication is included in a fourth <capability> element that is included in the first <hello> message.

In some embodiments, the method may further comprise receiving a fifth message from a controller of the device, wherein the fifth message comprises a fifth indication indicating a selected encryption algorithm.

According to another aspect, some embodiments include a device configured to use Network Configuration Protocol (NETCONF). The device may comprise processing circuitry and memory. The memory contains instructions that, when executed by the processing circuitry, cause the device to enable a function for NETCONF Datastore Security (DS-SEC) and publish a first indication indicating that the device supports the NETCONF DS-SEC function.

In some embodiments, publishing the indication indicating that the device supports the NETCONF DS-SEC function comprises sending a first message including the first indication to a controller of the device.

In some embodiments, the first message comprises a first <hello> message comprising a first <capability> element, and wherein the first <capability> element comprises the first indication.

In some embodiments, the memory may further include instructions that, when executed by the processing circuitry, cause the device to receive a second message from a controller of the device, wherein the second message comprises a second indication indicating whether the controller supports the NETCONF DS-SEC function.

In some embodiments, the second message comprises a second <hello> message comprising a second <capability> element, and wherein the second <capability> element comprises the second indication.

In some embodiments, the memory may further include instructions that, when executed by the processing circuitry, cause the device to receive a third message from a controller of the device and, enable or disable the NETCONF DS-SEC function of the device according to the message. In some embodiments, the third message comprises a Remote Procedure Call (RPC) from the controller. In other embodiments, the third message includes a third indication indicating to either enable or disable the NETCONF DS-SEC function of the device.

In some embodiments, the memory may further include instructions that, when executed by the processing circuitry, cause the device to publish a fourth indication indicating the encryption algorithm supported by the device. In some embodiments, the fourth indication is included in a fourth <capability> element that is included in the first <hello> message.

In some embodiments, the memory may further include instructions that, when executed by the processing circuitry, cause the device to receive a fifth message from a controller of the device, wherein the fifth message comprises a fifth indication indicating a selected encryption algorithm.

According to another aspect, some embodiments include a computer program product. The computer program product comprises computer-readable instructions stored in a non-transitory computer-readable storage medium of the computer program product. When the instructions are executed by processing circuitry (e.g., at least one processor) of a device, they enable the device to perform one or more of the described device functionalities.

According to another aspect, some embodiments also include corresponding computer programs and carriers. A computer program comprises instructions which, when executed on processing circuitry of a device configured to use NETCONF, cause the device to carry out any of the embodiments described above for the device. Embodiments further include a carrier containing such a computer program. This carrier may comprise one of an electronic signal, optical signal, radio signal, or computer readable storage medium.

According to another aspect, some embodiments include a method performed by a controller for controlling a device using Network Configuration Protocol (NETCONF). The method comprises receiving a first message from the device, wherein the first message comprises a first indication indicating that the device supports NETCONF Datastore Security (DS-SEC) function. The method may further comprise sending a second message to the device, wherein the second message comprises a second indication indicating whether the controller supports NETCONF Datastore Security (DS-SEC) function.

In some embodiments, the first message comprises a first <hello> message comprising a first <capability> element, wherein the first <capability> element comprises the first indication, wherein the second message comprises a second <hello> message comprising a second <capability> element, and wherein the second <capability> element comprises the second indication.

In some embodiments, the method may further comprise ignoring the first indication if the controller does not support the NETCONF DS-SEC function, or controlling the NETCONF DS-SEC function of the device if the controller supports the NETCONF DS-SEC function.

In some embodiments, controlling the NETCONF DS-SEC function of the device comprises at least one of enabling the NETCONF DS-SEC function for the device and disabling the NETCONF DS-SEC function for the device.

In some embodiments, controlling the NETCONF DS-SEC function of the device comprises sending a third message to the device, and wherein the third message includes a third indication indicating to either enable or disable the NETCONF DS-SEC function of the device. In some embodiments, the third message comprises a Remote Procedure Call (RPC).

In some embodiments, the method may further comprise receiving a fourth message from the device, wherein the fourth message includes a fourth indication indicating the encryption algorithm supported by the device.

In some embodiments, the method may further comprise sending a fifth message to the device, wherein the fifth message comprises a fifth indication indicating a selected encryption algorithm.

In some embodiments, the fourth message comprises the first <hello> message comprising a fourth <capability> element, and wherein the fourth <capability> element comprises the fourth indication.

According to another aspect, some embodiments include a controller configured for controlling a device using Network Configuration Protocol (NETCONF). The controller may comprise processing circuitry and memory. The memory contains instructions that, when executed by the processing circuitry, cause the controller to receive a first message from the device, wherein the first message comprises a first indication indicating that the device supports NETCONF Datastore Security (DS-SEC) function. The memory may further include instructions that, when executed by the processing circuitry, cause the controller to send a second message to the device, wherein the second message comprises a second indication indicating whether the controller supports NETCONF Datastore Security (DS-SEC) function.

In some embodiments, the first message comprises a first <hello> message comprising a first <capability> element, wherein the first <capability> element comprises the first indication, wherein the second message comprises a second <hello> message comprising a second <capability> element, and wherein the second <capability> element comprises the second indication.

In some embodiments, the memory may further include instructions that, when executed by the processing circuitry, cause the controller to ignore the first indication if the controller does not support the NETCONF DS-SEC function, or control the NETCONF DS-SEC function of the device if the controller supports the NETCONF DS-SEC function.

In some embodiments, controlling the NETCONF DS-SEC function of the device comprises at least one of enabling the NETCONF DS-SEC function for the device and disabling the NETCONF DS-SEC function for the device.

In some embodiments, controlling the NETCONF DS-SEC function of the device comprises sending a third message to the device, and wherein the third message includes a third indication indicating to either enable or disable the NETCONF DS-SEC function of the device. In some embodiments, the third message comprises a Remote Procedure Call (RPC).

In some embodiments, the memory may further include instructions that, when executed by the processing circuitry, cause the controller to receive a fourth message from the device, wherein the fourth message includes a fourth indication indicating the encryption algorithm supported by the device.

In some embodiments, the memory may further include instructions that, when executed by the processing circuitry, cause the controller to send a fifth message to the device, wherein the fifth message comprises a fifth indication indicating a selected encryption algorithm.

In some embodiments, the fourth message comprises the first <hello> message comprising a fourth <capability> element, and wherein the fourth <capability> element comprises the fourth indication.

According to another aspect, some embodiments include a computer program product. The computer program product comprises computer-readable instructions stored in a non-transitory computer-readable storage medium of the computer program product. When the instructions are executed by processing circuitry (e.g., at least one processor) of a controller, they enable the controller to perform one or more of the described controller functionalities.

According to another aspect, some embodiments also include corresponding computer programs and carriers. A computer program comprises instructions which, when executed on processing circuitry of a controller configured to control a device using NETCONF, cause the controller to carry out any of the embodiments described above for the controller. Embodiments further include a carrier containing such a computer program. This carrier may comprise one of an electronic signal, optical signal, radio signal, or computer readable storage medium.

BRIEF DESCRIPTION OF THE DRAWINGS

Exemplary embodiments will be described in more detail referring to the following figures, in which.

DETAILED DESCRIPTION

The embodiments set forth below represent information to enable those skilled in the art to practice the embodiments. Upon reading the following description, given the accompanying figures, those skilled in the art will understand the concepts of the description and will recognize applications of these concepts not addressed herein. These concepts and applications fall within the scope of the description.

In the following description, numerous specific details are set forth. However, it is understood that embodiments may be practiced without these specific details. In other instances, well-known circuits, structures, and techniques have not been shown in order not to obscure the understanding of the description. Those of ordinary skill in the art, with the included description, can implement appropriate functionality without undue experimentation.

Figure 1:
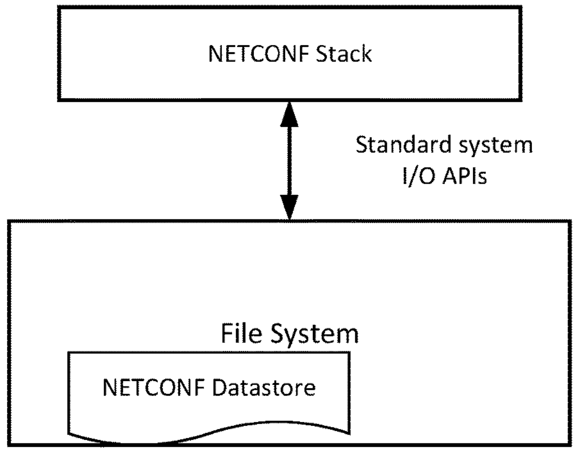
FIG. 1 is a schematic diagram illustrating an example of NETCONF Datastore access architecture according to the prior art.

Referring to FIG. 1, it is a schematic diagram illustrating an example of NETCONF Datastore access architecture. As illustrated, the NETCONF Datastore is saved locally in the file system of a device. The data of the NETCONF Datastore can be stored and read by the NETCONF Datastore stack via input/output application programming interfaces (I/O APIs) of the file system.

Figure 2:
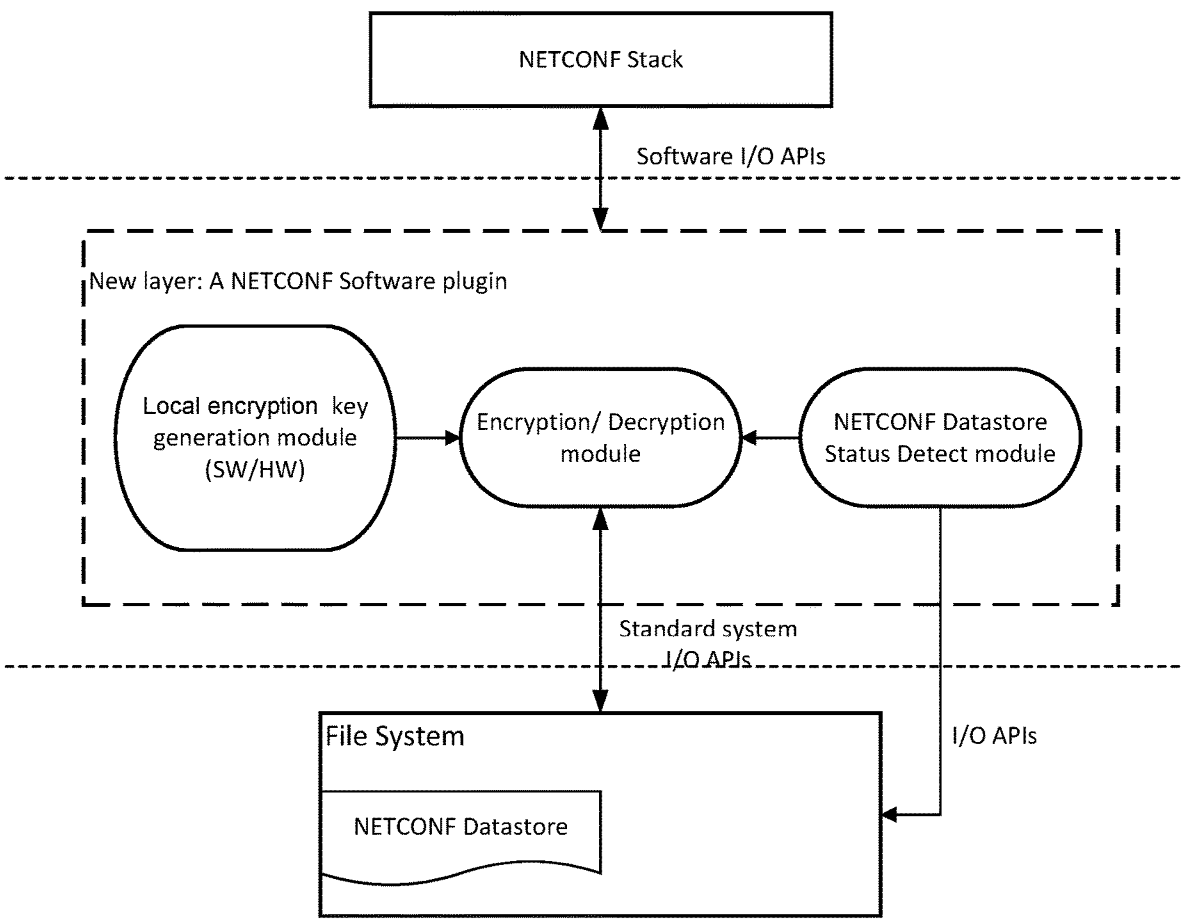
FIG. 2 is a schematic diagram illustrating an example of NETCONF Datastore access architecture according to some embodiments.

FIG. 2 is a schematic diagram illustrating an example of a NETCONF Datastore access architecture according to some embodiments. As illustrated, compared to the conventional architecture illustrated in FIG. 1, in the architecture of FIG. 2, a new abstraction layer, referred to as a NETCONF software plugin, is added between the NETCONF stack and the file system on the device. The plugin provides software I/O APIs between the NETCONF stack and itself and provides standard system I/O APIs between itself and the file system.

As shown in FIG. 2, the NETCONF software plugin comprises a local encryption key generation module, an encryption/decryption module, and a NETCONF Datastore status detection module.

In general, the local encryption key generation module is used to generate the key to encrypt/decrypt the NETCONF datastore. How to generate the local encryption key is not limited in the present disclosure. Any approaches available in the industry could be used for generating the local encryption key, e.g., generating the key by a hardware (HW) or a software (SW). Thus, the local encryption key generation module may comprise a hardware module, e.g., a Hardware Security Module (HSM) or a Trusted Platform Module (TPM) for generating a local encryption key (e.g., a private key of the hardware module). The local encryption key generation module may also comprise a software for generating a local encryption key (e.g., a private key).

TPM, also known as ISO/IEC 11889, is an international standard for a secure crypto processor, a dedicated microcontroller designed to secure hardware through integrated cryptographic keys. In general, TPM can be used to indicate a hardware integrating secure crypto processor.

HSM is a physical computing device that contains one or more secure crypto processor chips. It safeguards and manages digital keys, performs encryption and decryption functions for digital signatures, strong authentication, and other cryptographic functions.

When the NETCONF stack needs to read the NETCONF datastore from the file system, if the NETCONF datastore is encrypted, the plugin will use the key generated by the local encryption key generation module to decrypt the datastore and then send it to the NETCONF stack via the software I/O APIs.

When the NETCONF stack configures datastore to the file system, the plugin will encrypt the original datastore with the key generated by the local encryption key generation module and then save the datastore on the file system via the standard system I/O APIs.

The encryption/decryption algorithms and methods are not limited in the present disclosure. Usually, the encryption/decryption algorithms should support at least AES_128 to ensure the data is secure. The encryption/decryption method can be software method implemented privately or based on open source tools (e.g., OPENSSL), or be hardware method (If the host device has the HW security module, e.g., HSM/TPM) via Public-Key Cryptography Standards (PKCS) standard interfaces or other driver.

For a device which is already deployed and runs the NETCONF service, the plugin should provide the capability to detect the encryption status of the NETCONF datastore. It is for compatibility after, e.g., a software upgrade. When the NETCONF service starts up on a device, the NETCONF datastore may be encrypted (e.g., the software version is upgraded from a version which supports datastore encryption) or decrypted (e.g., the software is upgraded from a version which doesn't support datastore encryption).

For an encrypted NETCONF datastore, the plugin should decrypt the datastore file firstly and then do the further operation, e.g., encrypting the datastore with a new algorithm.

For a decrypted NETCONF datastore, the plugin should skip the decryption step and operate on the datastore directly, e.g., encrypting the datastore with a new algorithm.

To reach the compatibility target, an additional header needs to be added to the encrypted datastore, to indicate the NETCONF datastore status:

```
{
 /*For upper layer SW to indicate the header*/
magic_num;
/*File status, encrypted or original*/
file_status;
/*Encryption algorithm, it is useful for algorithm upgrading;
In this algorithm
upgrading case, the NETCONF needs to use old algorithm to decrypt the
datastore file and then encrypt it with new algorithm*/
enc_cipher;
};
```

Figure 3:
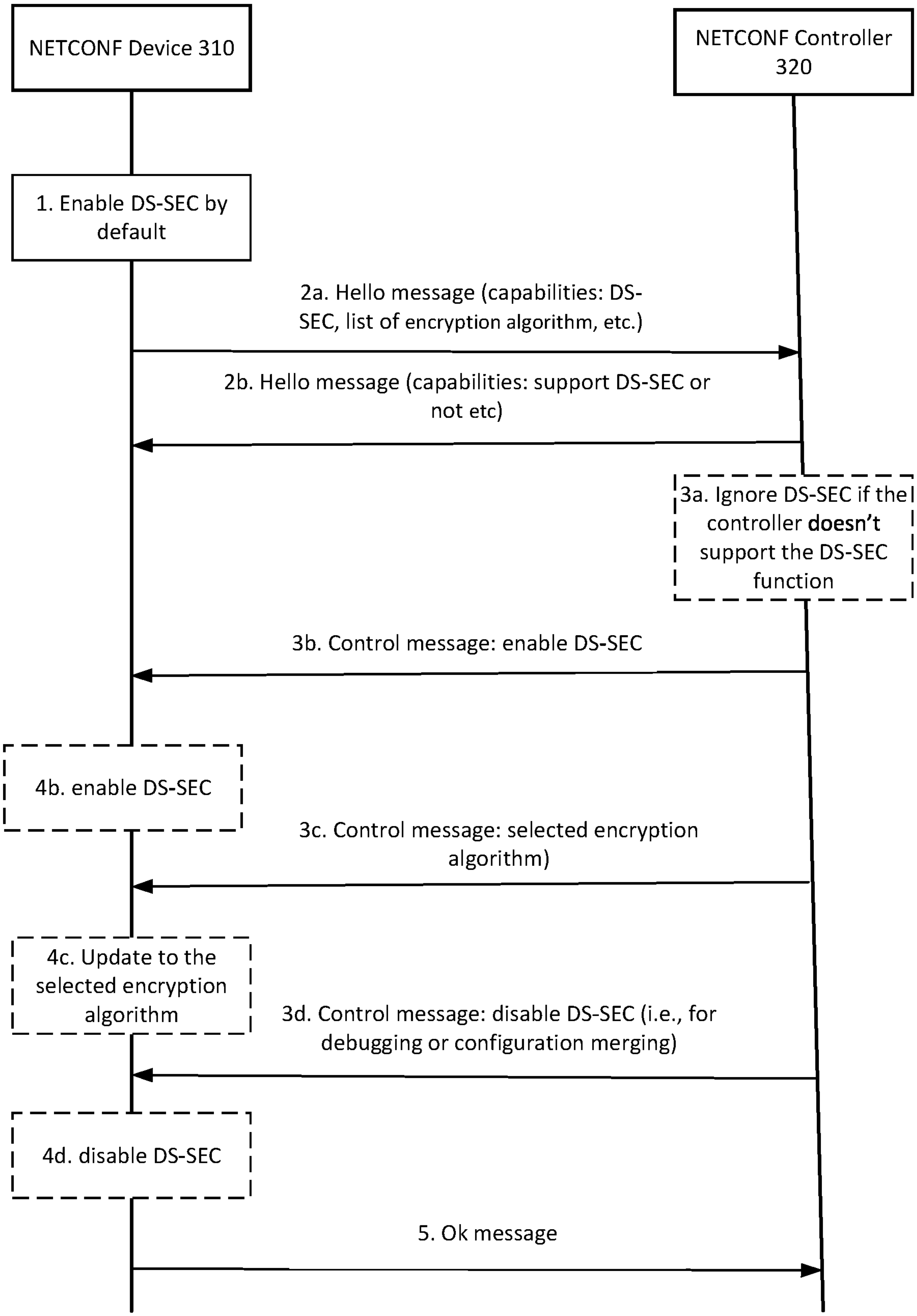
FIG. 3 is a signaling diagram for operating NETCONF Datastore encryption according to some embodiments.

FIG. 3 is a signaling diagram for operating NETCONF Datastore encryption according to some embodiments. As shown in FIG. 3, a NETCONF device 310 will always enable the datastore security function (DS-SEC) by default.

The plugin defines a new NETCONF capability as below: urn:ietf:params:netconf:capability:ds-sec:1.0

If the device 310 supports DS-SEC function, the device 310 should publish the capability (maybe also along with its supported algorithm list) in a <hello> message (step 2*a* in FIG. 3), for example:

```
<?xml version="1.0" encoding="UTF-8"?>
<hello xmlns="urn:ietf:params:xml:ns:netconf:base:1.0">
  <capabilities>
    <capability>urn:ietf:params:netconf:capability:ds-
sec:1.0&alg_list=aes_128,aes_256,des,3des</capability>
  </capabilities>
  <session-id>1</session-id>
</hello>
```

A NETCONF controller 320 of the NETCONF device 310 receives the <hello> message and sends a <hello> message, including whether it supports the DS-SEC function, to the device 310 (step 2*b* in FIG. 3).

If the controller 320 doesn't support the DS-SEC function, it should ignore this unknown capability based on the protocol definition (step 3*a* in FIG. 3).

If the controller 320 also supports the DS-SEC function, it could recognize this capability and know the device 310 support this function, then use an RPC to control this function (steps 3*b*, 3*c* and 3*d* in FIG. 3).

The RPC is defined such as to allow the controller 320 (of the device 310) to control, i.e., enable and disable, the DS-SEC function on the device 310 (steps 3*b* and 3*d* in FIG. 3)

When the NETCONF device 310 receives the control PRC that indicates enable or disable the DS-SEC function, the NETCONF device 310 will enable or disable the DS-SEC function on itself. (steps 4*b* and 4*d* in FIG. 3) and then sends an OK message to the NETCONF controller 320 (step 5 in FIG. 3).

In some embodiments, the RPC can be as follows:

```
    feature ds-sec {
description
    "NETCONF :ds-sec capability;
    If the server advertises the :ds-sec
    capability for a session, then this feature must
    also be enabled for that session. Otherwise,
    this feature must not be enabled.";
}
typedef ds-sec-type {
  type enumeration {
    enum ds-sec-enabled {
      description "Enable datastores security function";
    }
    enum ds-sec-disabled {
      description "Disable datastores security function";
    }
  }
  description "NETCONF Datastores Security Function Configuration";
}
rpc ds-sec-conf {
  description
  "Configure the datastore security function.";
  input {
    leaf ds-sec-value {
    type ds-sec-type;
    mandatory true;
    }
    leaf ds-sec-alg {
    type string;
    }
  }
}
```

In some embodiments, the RPC can be as follows thus the controller 320 could enable the datastore security function on device 310 with a default algorithm.

```
  /*By this RPC the controller could enable the datastore security func-
tion
on device with default algorithm*/
  <rpc message-id="103"
    xmlns="urn:ietf:params:xml:ns:netconf:base:1.0">
    <ds-sec-conf>
      <ds-sec-value>ds-sec-enabled</ds-sec-value>
    </ds-sec-conf>
  </rpc>
```

In some embodiments, the RPC can be as follows thus the controller 320 could enable the datastore security function on device 310 with an AES_128 encryption algorithm.

```
    /*By this RPC the controller could enable the datastore security
    function on device with AES_128 encryption algorithm*/
    <rpc message-id="103"
      xmlns="urn:ietf:params:xml:ns:netconf:base:1.0">
      <ds-sec-conf>
        <ds-sec-value>ds-sec-enabled</ds-sec-value>
        <ds-sec-alg>aes_128</ds-sec-alg>
      </ds-sec-conf>
    </rpc>
    /*This is the reply message from the device*/
    <rpc-reply message-id="103"
      xmlns="urn:ietf:params:xml:ns:netconf:base:1.0">
      <ok/>
    </rpc-reply>
```

The NETCONF controller 320 can also select an encryption algorithm and control the NETCONF device 310 to use the selected encryption algorithm for encrypting the NETCONF datastore (step 3*c* in FIG. 3).

When the NETCONF device 310 receives the selected encryption algorithm, it will use the selected encryption algorithm for encrypting (or re-encrypting) the NETCONF datastore (step 4*c* in FIG. 3) and then sends an OK message to the NETCONF controller 320 (step 5 in FIG. 3).

Though in some embodiments, all the devices 310 could use a common, default encryption algorithm, in other embodiments, it would be advantageous for the devices 310 to use different encryption algorithms. For example, the controller 320 could select the algorithm for different devices 310 flexibly based, for instance, on real deployment situation. For example, the controller 320 may choose a more complex algorithm (e.g., AES_128, AES_256, etc.) for a device 310 with more capabilities and implementing important roles in a network system, e.g., a server node, or a gateway node. The controller 320 may choose a less complex algorithm (e.g., AES_64, etc.) for a device 310 with limited capabilities, e.g., a constrained IoT device.

Figure 4:
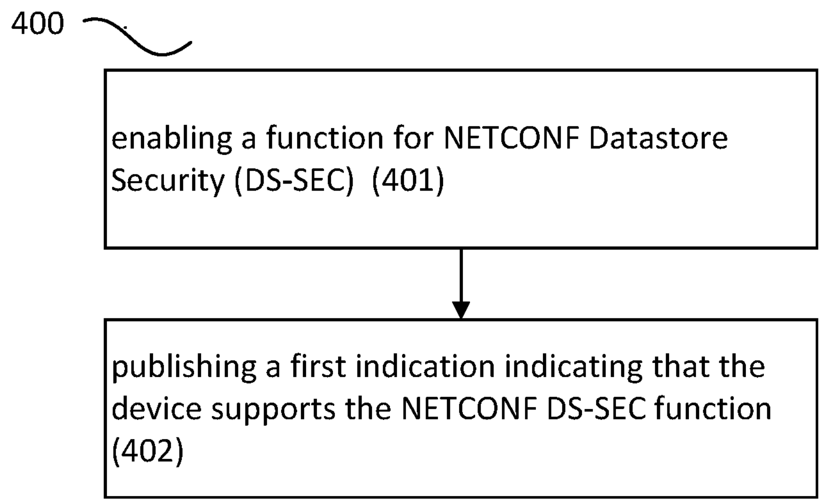
FIG. 4 is a logic flow diagram of a method performed by a device according to some embodiments.

FIG. 4 is a logic flow diagram of a method 400 performed by a NETCONF device according to some embodiments. The method 400 comprises enabling a function for NETCONF Datastore Security (DS-SEC) (Block 401). The method may further comprise publishing a first indication indicating that the device supports the NETCONF DS-SEC function (Block 402).

In some embodiments, publishing the indication indicating that the device supports the NETCONF DS-SEC function may comprises sending a first message including the first indication to a controller of the device. In some embodiments, the first message comprises a first <hello> message comprising a first <capability> element, wherein the first <capability> element comprises the first indication.

In some embodiments, the method 400 may further comprise receiving a second message from a controller of the device, wherein the second message comprises a second indication indicating that whether the controller supports the NETCONF DS-SEC function. In some embodiments, the second message may comprise a second <hello> message comprising a second <capability> element, and the second <capability> element comprises the second indication.

In some embodiments, the method 400 may further comprise receiving a third message from a controller of the device for either enabling or disabling the NETCONF DS-SEC function of the device according to the message. In some embodiments, the third message may comprise a Remote Procedure Call (RPC) from the controller. In some embodiments, the third message may include a third indication indicating to either enable or disable the NETCONF DS-SEC function of the device.

In some embodiments, the method 400 may further comprise publishing a fourth indication indicating the encryption algorithm(s) supported by the device. In some embodiments, the method may further comprise receiving a fifth message from the controller of the device, wherein the fifth message comprises a fifth indication indicating a selected encryption algorithm. In some embodiments, the fourth indication is included in a fourth <capability> element that is included in the first <hello> message.

Figure 5:
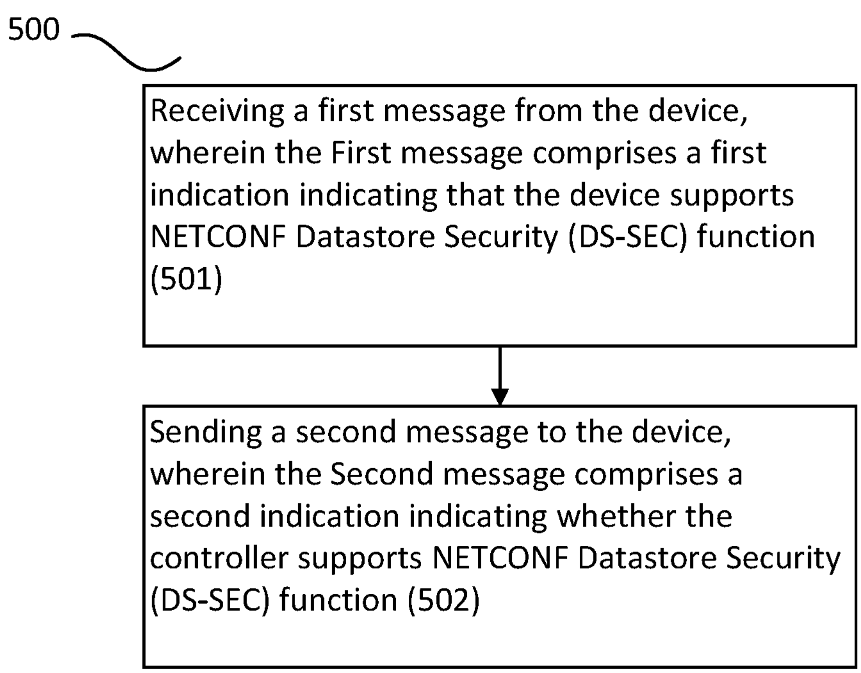
FIG. 5 is a logic flow diagram of a method performed by a controller according to some embodiments.

FIG. 5 is a logic flow diagram of a method 500 performed by a NETCONF controller according to some embodiments. The method 500 comprises receiving a first message from a device, wherein the first message comprises a first indication indicating that the device supports NETCONF Datastore Security (DS-SEC) function (Block 501). The method 500 may further comprise sending a second message to the device, wherein the second message comprises a second indication indicating whether the controller supports NETCONF Datastore Security (DS-SEC) function (Block 502).

In some embodiments, the first message comprises a first <hello> message comprising a first <capability> element and the first <capability> element comprises the first indication, and the second message comprises a second <hello> message comprising a second <capability> element and the second <capability> element comprises the second indication.

In some embodiments, the method 500 may further comprise ignoring the first indication if the controller doesn't support the NETCONF DS-SEC function, or controlling the NETCONF DS-SEC function of the device if the controller supports the NETCONF DS-SEC function.

In some embodiments, controlling the NETCONF DS-SEC function of the device may comprise at least one of enabling the NETCONF DS-SEC function for the device; and disabling the NETCONF DS-SEC function for the device.

In some embodiments, controlling the NETCONF DS-SEC function of the device may comprise sending a third message to the device, the third message including a third indication indicating whether to enable or disable the NETCONF DS-SEC function of the device. In some embodiments, the third message comprises a Remote Procedure Call (RPC).

In some embodiments, the method 500 may further comprise receiving a fourth message from the device, wherein the fourth message includes a fourth indication indicating the encryption algorithm(s) supported by the device. In some embodiments, the method may further comprise sending a fifth message to the device, wherein the fifth message comprises a fifth indication indicating a selected encryption algorithm. In some embodiments, the fourth message comprises the first <hello> message comprising a fourth <capability> element, and the fourth <capability> element comprises the fourth indication.

Figure 6:
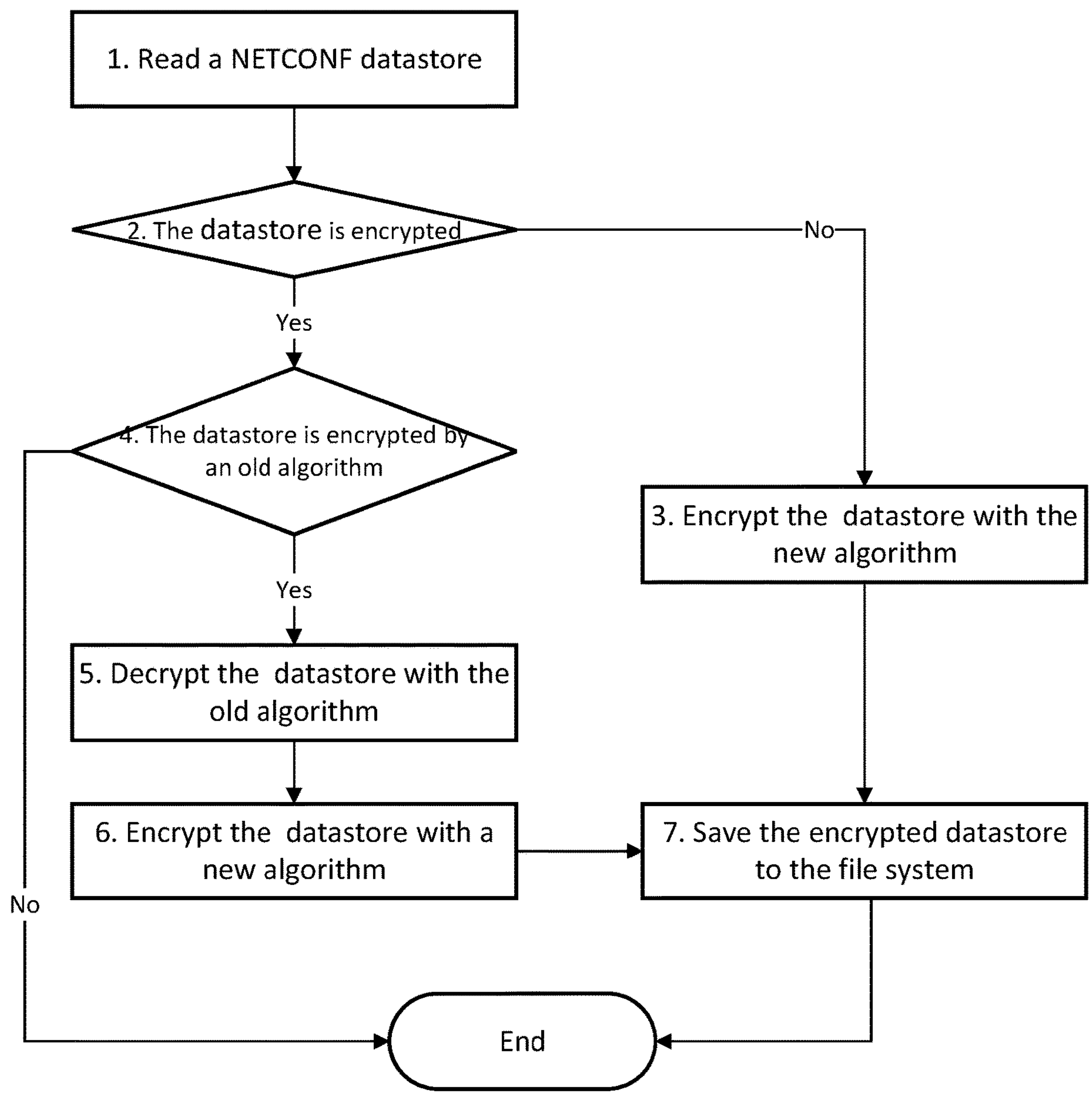
FIG. 6 is a flow chart of operations for updating encryption algorithm according to some embodiments.

FIG. 6 is a flow chart of operations for updating encryption algorithm for a NETCONF datastore according to some embodiments. Updating the encryption algorithm generally means changing the encryption algorithm used to encrypt the NETCONF datastore from a first algorithm (e.g., algorithm A) to a second algorithm (e.g., algorithm B).

When saving a NETCONF datastore, a parameter "cipher_type" can be used to identify the encryption algorithm.

When the encryption algorithm needs to be updated, i.e., the NETCONF device wants to update the encryption algorithm itself or a controller of the NETCONF device requests the device to use another encryption algorithm. Thus, a new encryption algorithm (e.g., algorithm B) will replace an old encryption algorithm (e.g., algorithm A). To make sure the NETCONF datastore which is encrypted by the old encryption algorithm can still be decrypted, when the encryption algorithm is updated, the device will read and check the NETCONF datastore saved in the file system (steps 1 and 2 in FIG. 6). As illustrated in the flow diagram in FIG. 6, if a NETCONF datastore is not encrypted, the device will encrypt the NETCONF datastore with the new encryption algorithm (step 3 in FIG. 6). However, if the NETCONF datastore has been encrypted by an old encryption algorithm, the device will first decrypt it using the old encryption algorithm and then encrypt it with the new encryption algorithm (steps 4 to 6 in FIG. 6). After that, the device will save the NETCONF datastore encrypted with the new encryption algorithm to the file system and update the parameter "cipher_type" to identify the new encryption algorithm (step 7 in FIG. 6).

Figure 7:
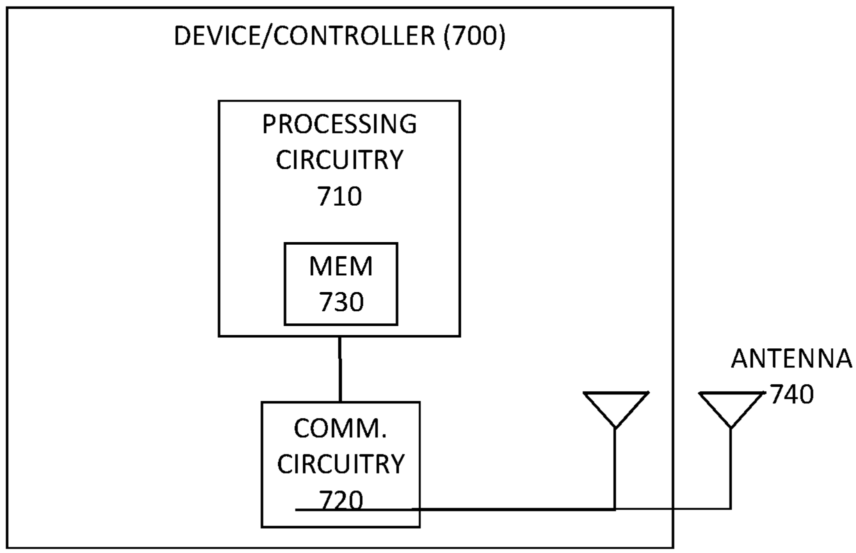
FIG. 7 is a block diagram of a device or a controller according to some embodiments.

FIG. 7 is a block diagram of an example of a wireless device (e.g., a wireless NETCONF device or a wireless NETCONF controller) 700 according to some embodiments. Wireless device 700 includes processing circuitry 710 and communication circuitry 720. As shown, the communication circuitry 720 (e.g., radio circuitry) is configured to transmit and/or receive information to and/or from one or more other nodes, e.g., via any communication technology. Such communication may occur via one or more antennas 740 that are either internal or external to the wireless device 700. The processing circuitry 710 is configured to perform processing described above (e.g., in FIGS. 3-6), such as by executing instructions stored in memory 730. The processing circuitry 710 in this regard may implement certain functional means, units, or modules.

Figure 8:
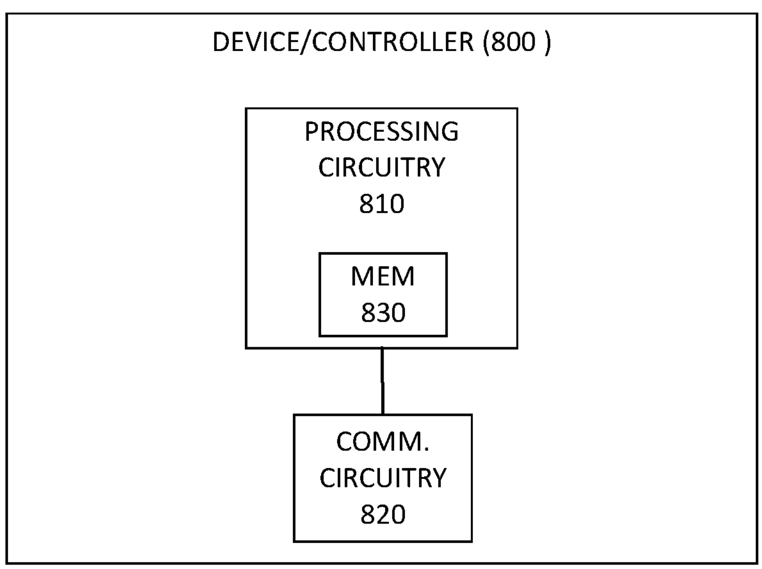
FIG. 8 is another block diagram of a device or a controller according to some embodiments.

FIG. 8 is a block diagram of an example of a wired device (e.g., a wired NETCONF device or a wired NETCONF controller) 800 according to some embodiments. As shown, the wired device 800 includes processing circuitry 810 and communication circuitry 820. The communication circuitry 820 is configured to transmit and/or receive information to and/or from one or more other nodes, e.g., via any communication technology. The processing circuitry 810 is configured to perform processing described above (e.g., in FIGS. 3-6), such as by executing instructions stored in memory 830. The processing circuitry 810 in this regard may implement certain functional means, units, or modules.

A computer program comprises instructions which, when executed on processing circuitry of a device (e.g., a wireless device, a wired device, etc.), cause the device to carry out any of the respective processing described above. A computer program in this regard may comprise one or more code modules configured to perform one or more steps of the processing described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by processing circuitry of a device (e.g., a wireless device, a wired device, etc.), cause the device to perform as described above.

Embodiments further include a computer program product comprising program code portions for performing the steps of any of the embodiments herein when the computer program product is executed by a computing device. This computer program product may be stored on a computer readable recording medium.

In some embodiments, the device may be a wireless device, e.g., a mobile phone, a user equipment or a wireless sensor in internet of thing (IoT). In other embodiments, the device may be a wired device, e.g., a computer or server in any kind of network system. In other embodiments, the device may implement a virtualized function or a network function which may co-exist with another network function, e.g., it may co-exist with a network function in 3GPP network system.

References in the specification to "one embodiment," "an embodiment," "an example embodiment," etc., indicate that the embodiment described may include a particular feature or a particular combination of features (e.g., component(s), element(s), integer(s), structure(s), operation(s), and/or step (s)), but every embodiment may not necessarily include the particular feature or the particular combination of features. Such phrases are not necessarily referring to the same embodiment. Further, when a particular feature, or a particular combination of features, is described in connection with an embodiment, it is submitted that it is within the knowledge of one skilled in the art to implement such feature, or combination of features, in connection with other embodiments whether or not explicitly described.

As used herein, the singular forms "a," "an," and "the" should include the plural forms, unless the context indicates otherwise. It will be further understood that the terms "comprises," "comprising," "includes," and/or "including" when used, specify the presence of the stated feature or features, but do not preclude the presence or addition of one or more other features.

Unless otherwise defined, all terms (including technical and scientific terms) used herein have the same meaning as commonly understood by one of ordinary skill in the art to which this invention belongs. It will be further understood that terms used should be interpreted as having a meaning that is consistent with their meaning in the context of this specification and the relevant art and will not be interpreted in an idealized or overly formal sense unless expressly so defined herein.

The above-described embodiments are examples only. Alterations, modifications and variations may be affected to the particular embodiments by those of skill in the art without departing from the scope of the description, which is defined solely by the appended claims.

The invention claimed is:

1. A method performed by a device using Network Configuration Protocol (NETCONF), the method comprising:

enabling a function for NETCONF Datastore Security (DS-SEC), wherein the function encrypts or decrypts a NETCONF Datastore and detects an encryption status of the NETCONF Datastore;

sending, to a controller of the device, a first message comprising a first indication indicating that the device supports the NETCONF DS-SEC function;

publishing a second indication indicating at least one encryption algorithm supported by the device; and receiving a second message from the controller of the device, wherein the second message comprises a third indication indicating a selected encryption algorithm, the selected encryption algorithm from the at least one encryption algorithm supported by the device.

2. The method according to claim 1, wherein the first message comprises a first <hello> message comprising a first <capability> element, and wherein the first <capability> element comprises the first indication.

3. The method according to claim 2, wherein the second indication is included in a second <capability> element that is included in the first <hello> message.

4. The method according to claim 1, further comprising:

receiving a third message from the controller of the device, wherein the third message comprises a fourth indication indicating whether the controller supports the NETCONF DS-SEC function.

5. The method according to claim 4, wherein the third message comprises a second <hello> message comprising a third <capability> element, and wherein the third <capability> element comprises the fourth indication.

6. The method according to claim 1, further comprising:

receiving a fourth message from the controller of the device;

enabling or disabling the NETCONF DS-SEC function of the device according to the fourth message.

7. The method according to claim 6, wherein the fourth message comprises a Remote Procedure Call (RPC) from the controller.

8. The method according to claim 6, wherein the fourth message includes a fifth indication indicating to either enable or disable the NETCONF DS-SEC function of the device.

9. A device configured to use Network Configuration Protocol (NETCONF), the device comprising processing circuitry and memory, the memory containing instructions executable by the processing circuitry whereby the device is configured to:

enable a function for NETCONF Datastore Security (DS-SEC), wherein the function encrypts or decrypts a NETCONF Datastore and detects an encryption status of the NETCONF Datastore;

send, to a controller of the device, a first message comprising a first indication indicating that the device supports the NETCONF DS-SEC function;

publish a second indication indicating at least one encryption algorithm supported by the device; and receive a second message from the controller of the device, wherein the second message comprises a third indication indicating a selected encryption algorithm, the selected encryption algorithm from the at least one encryption algorithm supported by the device.

10. A method performed by a controller for controlling a device using Network Configuration Protocol (NETCONF), the method comprising:

receiving a first message from the device, wherein the first message comprises a first indication indicating that the device supports a NETCONF Datastore Security (DS-SEC) function, wherein the function encrypts or decrypts a NETCONF Datastore and detects an encryption status of the NETCONF Datastore;

obtain a second indication indicating at least one encryption algorithm supported by the device; and sending a second message to the device, wherein the second message comprises a third indication indicating whether the controller supports NETCONF Datastore Security (DS-SEC) function and a fourth indication indicating a selected encryption algorithm, the selected encryption algorithm from the at least one encryption algorithm supported by the device.

11. The method according to claim 10, wherein the first message comprises a first <hello> message comprising a first <capability> element, wherein the first <capability> element comprises the first indication, wherein the second message comprises a second <hello> message comprising a second <capability> element, and wherein the second <capability> element comprises at least one of the third indication and the fourth indication.

12. The method according to claim 10, further comprising:

ignoring the first indication if the controller does not support the NETCONF DS-SEC function; or controlling the NETCONF DS-SEC function of the device if the controller supports the NETCONF DS-SEC function.

13. The method according to claim 12, wherein controlling the NETCONF DS-SEC function of the device comprises at least one of:

enabling the NETCONF DS-SEC function for the device; and disabling the NETCONF DS-SEC function for the device.

14. The method according to claim 12, wherein controlling the NETCONF DS-SEC function of the device comprises sending a third message to the device, and wherein the third message includes a fifth indication indicating to either enable or disable the NETCONF DS-SEC function of the device.

15. The method according to claim 14, wherein the third message comprises a Remote Procedure Call (RPC).

* * * * *